US012776445B2

(12) United States Patent
Mungale et al.

(10) Patent No.: US 12,776,445 B2
(45) Date of Patent: Oct. 27, 2026

(54) NdFeB POLYMER MAGNET COMPOSITE INCLUDING POLYCARBONATE MATRIX AND PROCESSING THEREOF

(71) Applicant: Tate Technology, LLC, Pacific Palisades, CA (US)

(72) Inventors: Kaustubh Mungale, Pacific Palisades, CA (US); M. Parans Paranthaman, Pacific Palisades, CA (US); Uday Kumar Vaidya, Pacific Palisades, CA (US)

(73) Assignee: TATE TECHNOLOGY, LLC, Pacific Palisades, CA (US)

( * ) Notice: Subject to any disclaimer, the term of this patent is extended or adjusted under 35 U.S.C. 154(b) by 950 days.

(21) Appl. No.: 17/859,559

(22) Filed: Jul. 7, 2022

(65) Prior Publication Data

US 2023/0008491 A1 Jan. 12, 2023

Related U.S. Application Data

(60) Provisional application No. 63/219,128, filed on Jul. 7, 2021.

(51) Int. Cl.
*H01F 41/02* (2006.01)
*B29B 7/00* (2006.01)
(Continued)

(52) U.S. Cl.
CPC ......... *H01F 41/0266* (2013.01); *B29B 7/005* (2013.01); *C08J 3/201* (2013.01);
(Continued)

(58) Field of Classification Search
CPC .... H01F 41/0266; H01F 1/057; H01F 1/0578; C08J 2369/00; C08J 3/201; B29K 2669/00; B29B 7/005
See application file for complete search history.

(56) References Cited

U.S. PATENT DOCUMENTS 10,766,181 B2 9/2020 Paranthaman
2007/0246865 A1 10/2007 Oakey
(Continued)

FOREIGN PATENT DOCUMENTS

DE 4434768 A1 4/1996
WO 2020257664 A1 12/2020

OTHER PUBLICATIONS

Manufacture of Modern Permanent Magnet Materials, https://arnoldmagnetics.com/wp-content/uploads/2017/10/Manufacture-of-Modern-Permanent-Magnet-Materials-Constantinides-PowderMet-2014-ppr.pdf.

(Continued)

*Primary Examiner* — C Melissa Koslow
(74) *Attorney, Agent, or Firm* — Jeffer Mangels & Mitchell LLP; Brennan C. Swain, Esq.

(57) ABSTRACT

Polymer magnet composites including NdFeB in a polycarbonate (PC) binder matrix are processed using processes including batch mixing and twin screw extrusion. One method includes adding PC to a compartment of a batch mixer and mixing the PC while the compartment is at a temperature greater than a flow temperature of the PC, to form a mixed PC material. The method also includes adding a NdFeB magnetic material to the compartment with the mixed PC material in four batches while the compartment is at the temperature greater than the flow temperature of the PC to form a mixed PC and NdFeB magnetic material, wherein each batch is mixed in the compartment for 1 to 3 minutes before the next batch is added. In addition, a total mixing time is 6 to 12 minutes, and the compartment includes an inert atmosphere. Other embodiments are described and claimed.

10 Claims, 20 Drawing Sheets

| Sample | Magnetic loading fraction (%) | Tensile Test | | | |
|---|---|---|---|---|---|
| | | Strength Mpa | | Modulus Gpa | |
| | | Mean | STD | Mean | STD |
| TSE | 20 | 37.39 | 2.08 | 2.78 | 0.057 |
| | 50 | 44.35 | 1.95 | 3.52 | 0.078 |
| | 75 | 32.96 | 5.41 | 4.09 | 0.214 |
| Batch Mixer | 20 | 39.45 | 6.76 | 2.61 | 0.032 |
| | 50 | 27.38 | 12.27 | 3.36 | 0.139 |
| | 75 | 51.36 | 12.66 | 6.69 | 0.147 |
| | 85 | 59.25 | 3.97 | 9.9 | 0.104 |
| | 95 | 43.91 | 3.96 | 2.26 | 0.104 |

(51) Int. Cl.

| | |
|---|---|
| ***B29K 669/00*** | (2006.01) |
| ***C08J 3/20*** | (2006.01) |
| ***H01F 1/057*** | (2006.01) |

(52) U.S. Cl.

CPC ........... *H01F 1/057* (2013.01); *H01F 1/0578* (2013.01); *B29K 2669/00* (2013.01); *C08J 2369/00* (2013.01)

(56) References Cited

U.S. PATENT DOCUMENTS

| | | | | |
|---|---|---|---|---|
| 2008/0149881 | A1* | 6/2008 | Park | C08L 67/025 252/62.54 |
| 2010/0229758 | A1 | 9/2010 | Gerhardt | |
| 2017/0326823 | A1 | 11/2017 | Kushalappa | |

OTHER PUBLICATIONS

Khosla et al. "Fabrication of NdFeB-based permanent rare-earth micromagnets by novel hybrid micromolding process." Mycrosystem Technologies 21.11 (2015): 2315-2320. p. 1-3 [online], < https://www.researchgate.net/profile/Sam-Kassegne/publication/280580135_Fabrication_of_NdFeB-based_permanent_rare-earth_micromagnets_by_novel_hybrid_micromolding_process/links/55bbf49808ae9289a0957943/Fabrication-of-NdFeB-based-permanent-rare-earth-micromagnets-by-novel-hybrid-micromolding-process.pdf >.

Mungale et al. "Compression molding of anisotropic NdFeB bonded magnets in a polycarbonate matrix." Metrialla. Sep. 1, 2021; 19:101167, p. 8-23 [online] < https://sciencedirect.com/science/article/am/pii/S2589152921001708 >.

* cited by examiner

| Material added (g) | Time between steps (minutes) | RPM | Temperature (°C) |
|---|---|---|---|
| Polycarbonate (10 g) | 0:00 | 40 | 200 |
| NdFeB (50 g) | 02:09.54 | 60 | 200 |
| NdFeB (50 g) | 02:27.91 | 60 | 200 |
| NdFeB (50 g) | 1:55.73 | 60 | 200 |
| NdFeB (40 g) | 2:02.63 | 60 | 200 |

| Zone 1 | Zone 2 | Zone 3 | Zone 4 | Zone 5 | Zone 6 | Zone 7 | Zone 8 | Zone 9 | Die (°C) |
|---|---|---|---|---|---|---|---|---|---|
| 90 | 110 | 150 | 170 | 180 | 190 | 200 | 205 | 210 | 215 |

FIG. 5

| Weight fraction (%) | Polymer feed rate (g/min) | Side feeder rate (g/min) |
|---|---|---|
| 20 | 140 | 50 |
| 55 | 50 | 60 |
| 77 | 20 | 70 |

FIG. 6

| | |
|---|---|
| Extruder Speed | 250 rpm (20% & 50% w.f.)<br>125 rpm (70% w.f.) |
| Melt pressure range at die plate | 3.79 – 6.20 MPa (550-900 psi) |
| No. of open die holes | 4 |
| Die hole diameter | 3.2 mm |

FIG. 7

| Step # | Pressure increments | Dwell time (min) |
|---|---|---|
| 1 | 1-ton force set point (SP) = 0.38 MPa (55 psi) | 15 |
| 2 | 3-ton force SP = 1.14 MPa (166.66 psi) | 5 |
| 3 | 5-ton force SP = 1.91 MPa (277.77 psi) | 5 |

FIG. 9

| Weight fraction (%) | Pressure applied (Single step) | Dwell time (min) |
|---|---|---|
| 75, 85 | 10-ton force set point (SP) = 3.83 MPa (555.55 psi) | 20 |
| 95 | 30-ton force set point (SP) = 11.49 MPa (1666.67 psi) | 20 |

FIG. 10

| Compounding equipment | Weight fraction (%) | Number of Specimens | Average plate thickness (mm) |
|---|---|---|---|
| Twin Screw Extruder | 20 | 5 | 3.18 |
| | 50 | 5 | 4.74 |
| | 70 | 5 | 4.59 |
| Batch Mixer | 20 | 5 | 2.72 |
| | 50 | 5 | 2.92 |
| | 70 | 5 | 1.92 |
| | 85 | 5 | 2.2 |
| | 95 | 3 | 3.8 |

FIG. 11

| Sample | Magnetic loading fraction (%) | Tensile Test | | | |
|---|---|---|---|---|---|
| | | Strength Mpa | | Modulus Gpa | |
| | | Mean | STD | Mean | STD |
| TSE | 20 | 37.39 | 2.08 | 2.78 | 0.057 |
| | 50 | 44.35 | 1.95 | 3.52 | 0.078 |
| | 75 | 32.96 | 5.41 | 4.09 | 0.214 |
| Batch Mixer | 20 | 39.45 | 6.76 | 2.61 | 0.032 |
| | 50 | 27.38 | 12.27 | 3.36 | 0.139 |
| | 75 | 51.36 | 12.66 | 6.69 | 0.147 |
| | 85 | 59.25 | 3.97 | 9.9 | 0.104 |
| | 95 | 43.91 | 3.96 | 2.26 | 0.104 |

FIG. 14

NdFeB POLYMER MAGNET COMPOSITE INCLUDING POLYCARBONATE MATRIX AND PROCESSING THEREOF

This application claims the benefit of U.S. Provisional Patent Application No. 63/219,128, filed Jul. 7, 2021, which is incorporated by reference herein in its entirety.

FIELD OF THE INVENTION

The present invention relates to the formation of polymer magnet composites including a neodymium magnet material in a polycarbonate matrix.

BACKGROUND OF THE INVENTION

Permanent magnets are omnipresent in a broad range of industries. They are used in devices like actuators, transducers, sensors, magnetic resonance imaging (MRI) machines as well as consumer goods such as speakers and personal computers (J. Coey, Journal of Magnetism and Magnetic Materials 248(3) (2002) 441-456). A typical automobile uses permanent magnets in starter motors, seat adjusters, wipers and traction motors in hybrid vehicles in various proportions (J. Ormerod, S. Constantinides, Journal of Applied Physics 81(8) (1997) 4816-4820; B. Davies, R. Mottram, I. Harris, Journal of Materials Chemistry and Physics 67(1-3) (2001) 272-281). Neodymium magnets (also known as NdFeB magnets) are widely used rare earth magnets and exhibit the highest magnetic strength among all commercially available permanent magnets, up to ten times greater than conventional ferrite magnets (J. Lucas, P. Lucas, T. Le Mercier, A. Rollat, W. G. Davenport, Rare earths: science, technology, production and use, Elsevier 2014). They are comprised of $Nd_2Fe_{14}B$ intermetallic compound as their main phase, which has a unique tetragonal structure with the easy axis parallel to the c-axis (J. Ormerod, Journal of the Less Common Metals 111(1-2) (1985) 49-69). The unique crystal structure contributes to large uniaxial anisotropy and exceptional magnetic properties of the compound having a remanence ($B_r$) of 1.4 T, intrinsic coercivity ($H_{ci}$) of 2000 kA/m and maximum energy product ($BH_{max}$) as high as 440 kJ/m$^3$ (B. Davies, R. Mottram, I. Harris, Journal of Materials Chemistry and Physics 67(1-3) (2001) 272-281). General Motors and Sumitomo Special Metals first developed neodymium magnets independently (M. Sagawa, S. Fujimura, N. Togawa, H. Yamamoto, Y. Matsuura, Journal of Applied Physics 55(6) (1984) 2083-2087; J. J. Croat, J. F. Herbst, R. W. Lee, F. E. Pinkerton, Journal of Applied Physics 55(6) (1984) 2078-2082). The research was motivated by the high cost of Samarium-cobalt (SmCo), another critical magnet in the first generation of the rare earth family. Since then extensive research has been conducted in improving intrinsic properties and manufacturing techniques of neodymium based permanent magnets (P. Campbell, Permanent magnet materials and their application, Cambridge University Press 1996). NdFeB magnets are classified into two broad categories of sintered and bonded magnets. Until late 1990's, sintered magnets were produced through powder metallurgy. More recently, strip casting techniques is dominating higher grade NdFeB magnets (Manufacture of Modern Permanent Magnet Materials, https://www.arnold-magnetics.com/wp-content/uploads/2017/10/Manufacture-of-Modern-Permanent-Magnet-Materials-Constantinides-PowderMet-2014-ppr.pdf; Y. Kaneko, F. Kuniyoshi, N. Ishigaki, Compounds, 408 (2006) 1344-1349). This is followed by sintering and heat treatment. The precursor for sintering involves conventional metallurgy powder, melt spun microcrystalline material produced by rapid solidification and crushed casted strips depending upon the performance needed for producing sintered magnets. Precursors (or flakes) are grounded to particles by fine grinding methods like jet milling. Advanced techniques such as atomization and hydrogen decrepitation deabsorbation recombination (HDDR) are used to produce nanocrystalline phased materials with desired morphologies (B. Ma, J. Herchenroeder, B. Smith, M. Suda, D. Brown, Z. Chen, m. materials, Journal of Magnetism and Magnetic Materials 239(1-3) (2002) 418-423). While sintered magnets retain their full density and magnetic strength, they have issues of brittleness, poor and corrosion.

Polymer bonded magnets (PBM's) offer advantages such as intricate geometry manufacturing, enhanced thermal stability, corrosion resistance and high mechanical properties (J. Xiao, J. Otaigbe, Compounds, 309(1-2) (2000) 100-106). Bonded magnets require the use of a polymer binder system. Typically, bonded magnets have an intermediate energy product (79.58-143.24 kJ/m$^3$) and lower density (D. Brown, B.-M. Ma, Z. Chen, Journal of Magnetism Magnetic Materials 248(3) (2002) 432-440; L. Li, B. Post, V. Kunc, A. M. Elliott, M. P. J. S. M. Paranthaman, Scripta Materialia 135 (2017) 100-104). The strength of bonded magnets depends on the volume fraction of the magnetic compound by a squared proportionality, given by the following relation (S. Zhou, Q. Dong, Super Permanent Magnets—Permanent Magnetic Material of Rare-Earth and Iron System, Metallurgy Industry Publishing, Beijing, 2004):

$$(BH)_{max} \propto \left[(1 - V_{non})\frac{d}{d_m}B_r(p)\right]2 \quad (1)$$

In Equation (1), $V_{non}$ is the volume fraction of polymer matrix; d is the density of the magnet; $d_m$ is the density of ideal bonded magnet with no porosity/voids. Hence, it is well known that to maximize the strength of a magnet, it is vital to increase the volume fraction of the magnetic phase while maintaining good mechanical properties and low flux loss(es).

SUMMARY OF THE PREFERRED EMBODIMENTS

One embodiment includes a method for forming a polymer magnet composite, comprising adding polycarbonate to a compartment of a batch mixer and mixing the polycarbonate while the compartment is at a temperature greater than a flow temperature of the polycarbonate, to form a mixed polycarbonate. The method also includes adding NdFeB to the compartment with the mixed polycarbonate in four batches while the compartment is at the temperature greater than the flow temperature of the polycarbonate to form a mixed polycarbonate and NdFeB material, wherein each batch is mixed in the compartment for a time period in the range of 1 to 3 minutes before the next batch is added. The method also includes a total mixing time in the range of 6 to 12 minutes, and the compartment includes an inert atmosphere.

Embodiments also include a method for forming a polymer magnet composite comprising feeding a polycarbonate material into a twin screw extruder at a first region in the twin screw extruder having a temperature lower than a glass transition temperature of the polycarbonate material. The method also includes feeding a neodymium magnetic material to the twin screw extruder at a second region in the twin screw extruder having a temperature greater than the glass transition temperature of the polycarbonate material. The method also includes passing the polycarbonate material and the neodymium material in the twin screw extruder through a kneading block region to disperse the neodymium material in the polycarbonate material. In addition, the method includes passing the dispersed neodymium material and the polycarbonate material through a third region in the twin screw extruder having a higher temperature than the second region.

BRIEF DESCRIPTION OF THE DRAWINGS

FIG. 5 is a table including processing temperatures in zones of a twin screw extruder in accordance with certain embodiments.

FIG. 6 is a table including weight fractions and feed rates for compounding samples in a twin screw extruder in accordance with certain embodiments.

FIG. 7 is a table of extruder parameters for compounding samples in a twin screw extruder in accordance with certain embodiments.

FIG. 9 is a table including compression molding conditions for forming lower weight fraction NdFeB samples in accordance with certain embodiments.

FIG. 10 is a table including compression molding conditions for higher weight fraction NdFeB samples in accordance with certain embodiments.

FIG. 11 is a table including specification relating to tensile specimens produced in accordance with certain embodiments.

FIG. 14 is a table including tensile properties of material formed in accordance with certain embodiments.

DETAILED DESCRIPTION OF THE PREFERRED EMBODIMENTS

Figures 1, 2:
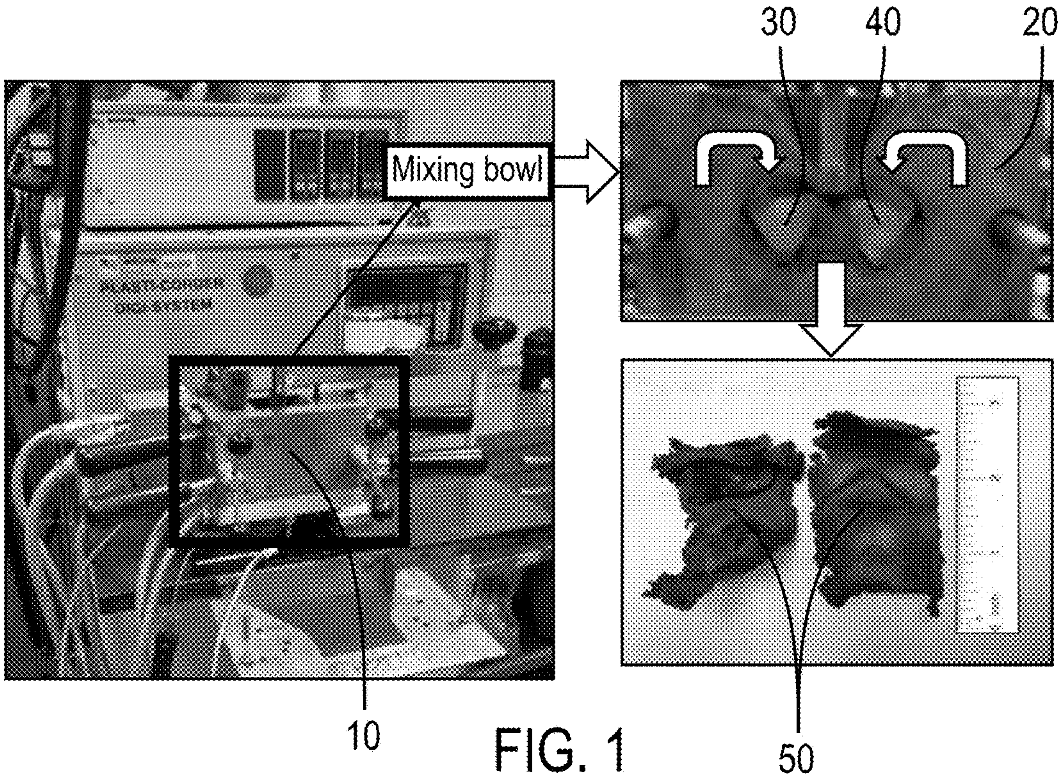
FIG. 1 illustrates a batch mixer and mixed material processed in accordance with certain embodiments.
FIG. 2 is a table including processing parameters in accordance with an embodiment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing, then this provides support for a negative limitation in the claims stating that that component is "not" present. However, the above statement is not limiting, and in another embodiment, the missing component can be included in a claimed embodiment.

Reference in this specification to "one embodiment," "an embodiment," "certain embodiments," "a preferred embodiment" or any other phrase mentioning the word "embodiment" means that a particular feature, structure, or characteristic described in connection with the embodiment is included in at least one embodiment of the disclosure and also means that any particular feature, structure, or characteristic described in connection with one embodiment can be included in any embodiment or can be omitted or excluded from any embodiment. The appearances of the phrase "in one embodiment" or the like in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, products, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Parameters of importance for bonded magnets may include the loading factor, molding technique, intrinsic strength and morphology of the magnetic powders used. Traditional manufacturing processes used for production of bonded magnets include compression molding, injection molding, extrusion and calendaring. Up to 65% magnetic volume fraction is attained using injection molding, whereas up to 80 volume % is attained by using compression molding technique with thermoset resins (J. Ormerod, S. Constantinides, Journal of Applied Physics 81(8) (1997) 4816-4820). More recently, advanced manufacturing techniques like additive manufacturing have been investigated (M. P. Paranthaman, I. Nlebedim, F. Johnson, S. Mccall, Material Matters 11 (2016) 111-116; K. Gandha, L. Li, I. Nlebedim, B. K. Post, V. Kunc, B. C. Sales, J. Bell, M. P. Paranthaman, M. Materials, Journal of Magnetism and Magnetic Materials 467 (2018) 8-13; M. P. Paranthaman, V. Yildirim, T. N. Lamichhane, B. A. Begley, B. K. Post, A. A. Hassen, B. C. Sales, K. Gandha, I. C. J. M. Nlebedim, Materials 13(15) (2020) 3319). Among these, binder jet (M. P. Paranthaman, C. S. Shafer, A. M. Elliott, D. H. Siddel, M. A. McGuire, R. M. Springfield, J. Martin, R. Fredette, J. J. Ormerod, Journal of The Minerals, Metals & Materials Society 68(7) (2016) 1978-1982), fused deposition modeling (L. Li, A. Tirado, I. Nlebedim, O. Rios, B. Post, V. Kunc, R. Lowden, E. Lara-Curzio, R. Fredette, J. Ormerod, Scientific Reports 6 (2016) 36212; K. Gandha, I. C. Nlebedim, V. Kunc, E. Lara-Curzio, R. Fredette, M. P. Paranthaman, *Scripta* Materialia 183 (2020) 91-95; I. Nlebedim, H. Ucar, C. B. Hatter, R. McCallum, S. K. McCall, M. Kramer, M. P. Paranthaman, M. Materials, Journal of Magnetism and Magnetic Materials 422 (2017) 168-173) and direct write printing (B. G. Compton, J. W. Kemp, T. V. Novikov, R. C. Pack, C. I. Nlebedim, C. E. Duty, O. Rios, M. P. Paranthaman, M. Processes, Journal of Materials and Manufacturing Processes 33(1) (2018) 109-113) have been studied in recent years.

PBM's are manufactured by blending of pulverized permanent magnet powders with various polymer systems such as polyamides (PA) (M. G. Garrell, A. J. Shih, B.-M. Ma, E. Lara-Curzio, R. O. Scattergood, M. Materials, Journal of Magnetism and Magnetic Materials 257(1) (2003) 32-43), polyphenylene sulfide (PPS) (M. G. Garrell, B.-M. Ma, A. J. Shih, E. Lara-Curzio, R. O. Scattergood, E. A, Journal of Material Science and Engineering: A 359(1-2) (2003) 375-383) and thermoset epoxies (F. Zhai, A. Sun, D. Yuan, J. Wang, S. Wu, A. A. Volinsky, Z. Wang, compounds, Journal of Alloys and Compounds 509(3) (2011) 687-690). Mechanical characterization of high-density bonded PA and PPS is reported in literature (M. G. Garrell, A. J. Shih, B.-M. Ma, E. Lara-Curzio, R. O. Scattergood, M. Materials, Journal of Magnetism and Magnetic Materials 257(1) (2003) 32-43; M. G. Garrell, B.-M. Ma, A. J. Shih, E. Lara-Curzio, R. O. Scattergood, E. A, Journal of Material Science and Engineering: A 359(1-2) (2003) 375-383; L. Dobrzański, B. Ziębowicz, M. Drak, M. Engineering, Journal of Achievements in Materials and Manufacturing Engineering 18(1-2) (2006) 79-82). However, there is a lack of studies on mechanical and magnetic properties of NdFeB in a polycarbonate (PC) matrix. PC is an amorphous engineering polymer with exceptional impact strength (Brabender Plasticorder technical design sheet, https://webport.brabender.com/s9MqLziYXN). PC has a glass transition temperature of 145° C., where it softens, and it flows at 155° C. Liu et al. explained that NdFeB magnets have a low impact toughness and often result in chipping, cracking, fracture and thus production losses (J. Liu, P. Vora, M. Walmer, E. Kottcamp, S. Bauser, A. Higgins, S. Liu, Journal of Applied Physics 97(10) (2005) 10H101). For expanding the use of bonded magnets in suitable applications, it is essential to benchmark basic mechanical and magnetic properties of high-performance engineering polymers such as PC. In this work, embodiments may include NdFeB and polycarbonate (PC) polymer magnet composites and processes for their manufacture. Such composite magnets were manufactured using two different types of compounding equipment, compression molding techniques, and characterized for their mechanical and magnetic properties.

In aspects of certain embodiments, composites including anisotropic bonded $Nd_2Fe_{14}B$ (NdFeB) magnets in a polycarbonate (PC) binder matrix may be fabricated using batch mixing or twin screw extruder (TSE) mixing, together with a compression molding process. The weight fractions (w.f.) of NdFeB in PC on the batch mixer are 20, 50, 75, 85 and 95% compared to the TSE with 20, 50 and 75% respectively. The density of the 95% batch mixed magnets fabricated was 5.34 g/cm$^3$ and the magnetic properties are, intrinsic coercivity $H_{ci}$=942.99 kA/m, remanence $B_r$=0.86 T, and energy product $(BH)_{max}$=120.96 kJ/m$^3$. The measured tensile properties are in the range of 27-59 MPa, comparable to that of polyamide (PA), polyphenylene sulfide (PPS) bonded magnets and demonstrating potential for bonded magnet applications. Scanning electron microscopy showed that the onset of failure occurs in the magnetic particle-matrix interface. This demonstrates that such processing operations can be used to fabricate high performance NdFeB polycarbonate composite magnets with improved mechanical properties.

For certain embodiments, two types of compounding equipment—a low volume (100-200 g) lab scale batch mixer (Brabender® Plasticorder W50) and a high throughput (10 kg/hr) twin screw extruder (Berstorff Z25) were employed for melt processing and compounding in accordance with certain embodiments to form polymer metal composites. Compounded extrudates were compression molded into flat plates using the Carver 30 Ton Model #3895 hydraulic press. FIG. 1 shows a representative flow of the manufacturing steps, with operations in accordance with certain embodiments described below. Extrusion grade polycarbonate (PC) Lexan resin with density of 1.2 g/cm$^3$, Magnequench anisotropic NdFeB powder with energy product of 302.39 KJ/m$^3$ (MQA™) produced by Magnet Applications® Inc., having density of 7.6 g/cm$^3$ were used throughout the work. PC is dried for three hours at 80° C. in an oven before processing.

As seen in FIG. 1, the Brabender® Plasticorder W50 batch mixer is comprised of a 'mixer bowl' with two counter-rotating blades 30, 40 that move in opposite directions as indicated by the arrows adjacent to the blades 30, 40 (Brabender® Plasticorder technical design sheet, https://webport.brabender.com/s9MqLziYXN). The mixer bowl has a free volume of 55 cm$^3$ and is surrounded by two walls 10, 20. A temperature control system is used to program the heat setting of the walls 10, 20 and mixer bowl, allowing three zonal settings. The melt (or flow) temperature for PC is determined to be 155° C. The presence of the magnetic particles may inhibit the flow of the polymer and as a result, in certain embodiments, for melt processing of lower magnetic loading fraction (20%, 50% w.f.), a uniform setting of 180° C. is used across the three zones. For higher loading fraction (75-98% w.f.), in certain embodiments the zonal temperatures are raised to 200° C. to 220° C. to ensure proper melt flow, given the low amount of polymer in the mixture.

The mixer bowl and walls 10, 20 are heat soaked for one hour before beginning the melt processing. The mixer bowl is purged with nitrogen gas via a movable arm and an inner channel that opens at the top of the mixer bowl. An inert atmosphere such as, for example, nitrogen, is used to inhibit the degrading of the magnetic powder. The arm in its closed position encloses the mixer bowl entirely allowing a continuous nitrogen flow and enabling inert atmosphere processing. The mixer blade speed is set at 40 rpm and neat PC is added to the mixer bowl. Typical melt processing conditions of 95% weight fraction (w.f.) MQA™ NdFeB/PC magnet in a batch mixer used in certain embodiments is reported in FIG. 2. The magnetic powder is added in batches when polymer in the chamber has melted, usually after one minute of adding the polymer. NdFeB magnetic particles are added in small batches (50 g or 40 g as seen in FIG. 2) to minimize wear on the blades and to avoid over-torquing the motor. The blade speed is increased to 60 rpm at this point for effective dispersion of the magnetic powders within the matrix. The batches may be separated by about two minutes each or until a uniform melt is achieved and minimal unmixed powder is visible in the mixer bowl. An example of the product 50 is shown in FIG. 1

To achieve suitable high volume fraction composites, such as, for example, 95% weight fraction of the NdFeB magnetic powder and 5% polycarbonate, the starting materials must be carefully mixed so as to promote uniform mixing while at the same time minimizing damaging the magnetic properties of the NdFeB particles. As described herein, this has been accomplished in certain embodiments by first heating the polycarbonate to a temperature above its melt temperature (temperature at which the polycarbonate flows) and mixing the polycarbonate for a time of about 1 minute to about 3 minutes, followed by adding the NdFeB in batches and mixing each batch for a time in the range of about 1 minute to about 3 minutes. The total time of mixing for the polycarbonate and the NdFeB may in certain embodiments be in a range of from 6 to 12 minutes. Certain preferred embodiments utilize a total mixing time of 8-10 minutes. It is believed that mixing the composition for more time leads to degradation of the magnetic properties of the NdFeB particles. By adding the particles in batches, sufficient mixing of the particles and the polycarbonate polymer and may be successfully achieved while preserving the desirable magnetic properties of the material.

Figure 3:
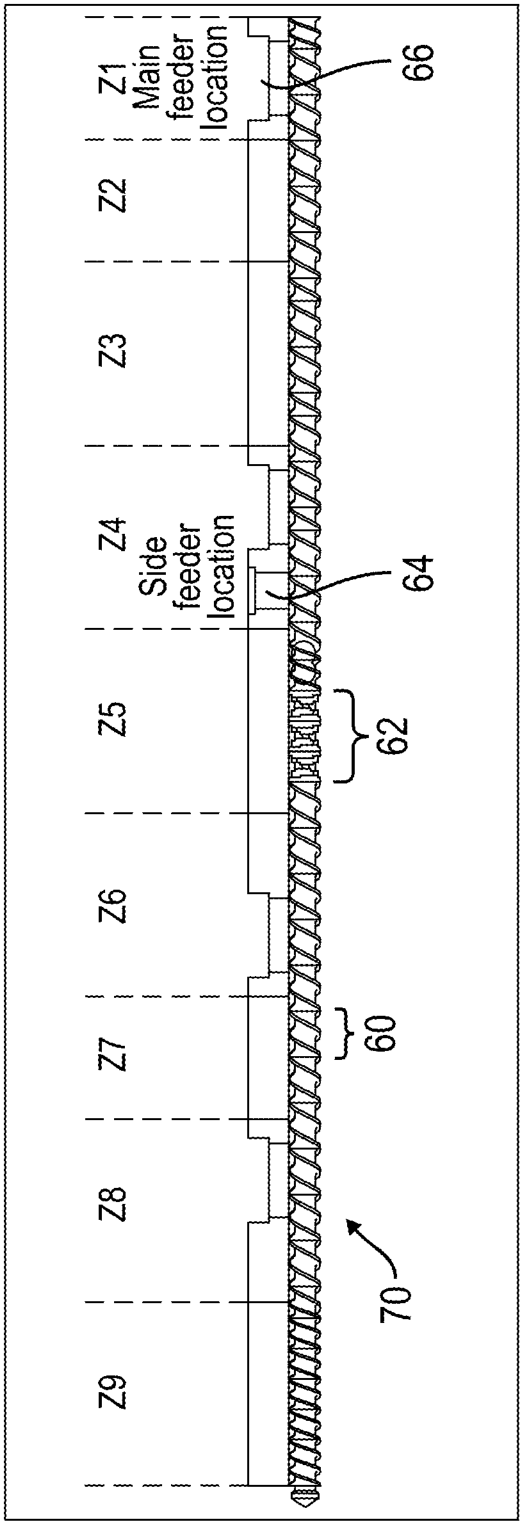
FIG. 3 illustrates a screw design showing the position of certain features used in a twin screw extruder in accordance with certain embodiments.
Figure 4:
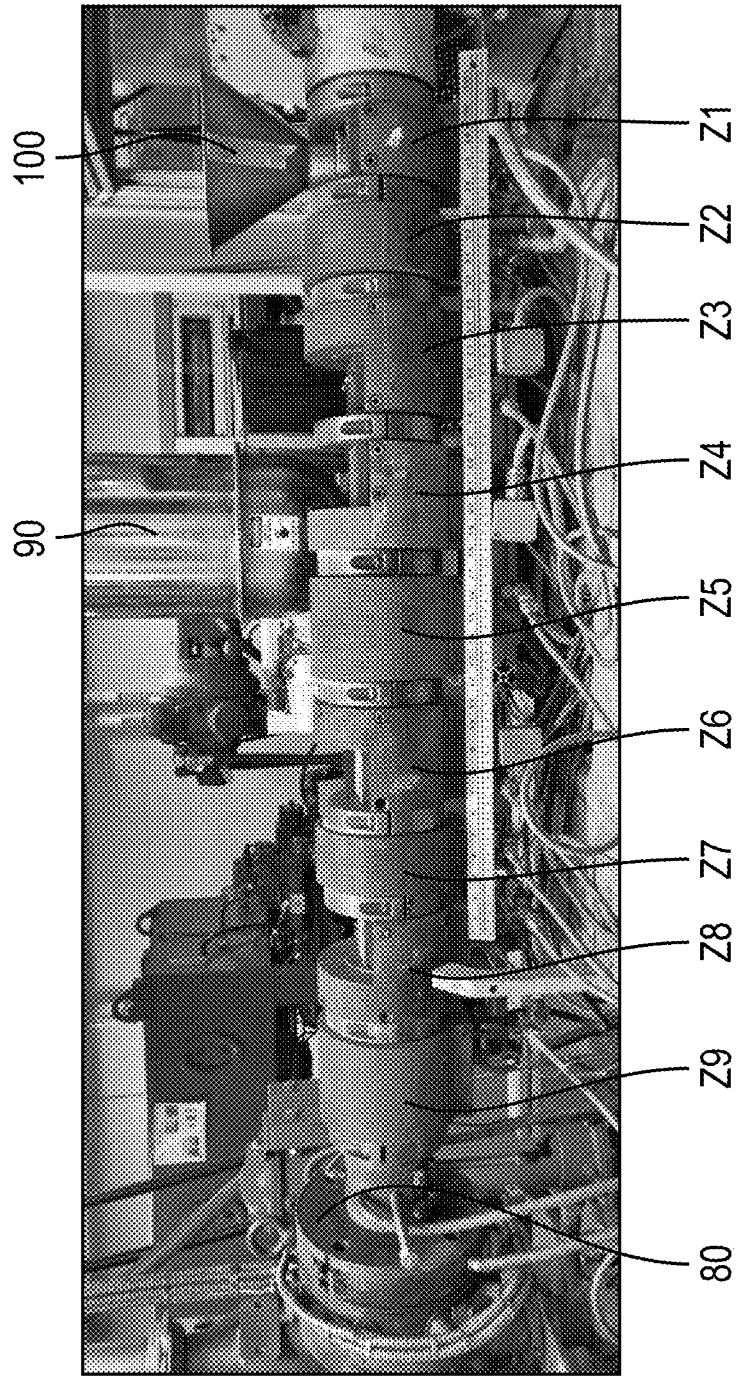
FIG. 4 is a side view of a twin screw extruder utilized in certain embodiments.

Embodiments may utilize an extruder having a plurality of heating regions for mixing the magnetic particles and polymer to form a polymer magnetic composite. A Berstorff Z25 twin screw extruder (TSE) was used in this work for the preparation of polymer magnetic composites in accordance with certain embodiments. The TSE has a screw of length 1200 mm. FIGS. 3-4 show certain aspects of the TSE. FIG. 4 is a pictorial representation of the TSE including barrel zones Z1 through Z9 and die plate 80. Portions of a main feeder 100 for feeding the polycarbonate and side feeder 90 for feeding the NdFeB are also illustrated in FIG. 4. The diameter of the screws is 25 mm, center to center distance of screws is 21.5 mm and the length by diameter (L/D) ratio is 48. It includes nine modular barrel elements enclosing the screw. The use of nine barrel elements means that nine independently controlled temperature zones may be utilized, which may increase the time the materials are residing in the barrels and lead to increased homogenization. The terminal barrel element (Z9) is attached to a four-hole die 80 with hole diameter of 2.4 mm. The barrel elements Z1-Z9 and the die 80 are heated with cartridge heaters and a temperature control system. Zonal temperatures for compounding NdFeB/PC are shown in FIG. 5. Each zone in the table represents one modular barrel element. Temperature at the feed zone Z1 is set at 90° C. and is increased in an ascending order up to the die. Like the batch mixer, the TSE is heat soaked for an hour before processing. The PC is added at the feed throat using an overhead K-tron self-calibrating gravimetric feeder at position 66 as shown FIG. 3. The NdFeB is metered downstream directly into the barrel using a K-Tron KT-20 twin screw gravimetric feeder. An inert gas such as, for example, N2, may be fed into the feed zone to inhibit degradation of the NdFeB. The side feeder 90 was placed downstream to allow the polycarbonate to attain melt flow when the NdFeB magnetic powder is introduced to the process. The use of a side feeder has shown efficient metering of fillers and compounds compared to overhead feeders (P. Yeole, S. Alwekar, N. K. P. Veluswamy, S. Kore, N. Hiremath, U. Vaidya, M. J. P. Theodore, P. Composites, (2020) 0967391120930109). The feeder screws are enclosed by a discharge tube attached to a side port on barrel element Z4 at position 64 as shown in FIG. 3. The modular twin screw elements up to zone 4 are conveying block elements.

At zone 5, one zone downstream from when the magnetic powder is introduced, a block of three kneading elements 62 is used for dispersing the magnetic powder in the polycarbonate matrix. All the elements 60 following the kneading blocks until the terminal zone are conveying elements. The screw 70 is designed for low shear to minimize screw wear due to the large particle size distribution (100-150 μm) of the NdFeB magnetic particles. The details of weight fractions of the NdFeB/PC polymer magnetic composites compounded with the corresponding feed rates are listed in FIG. 6. Feed rates were reduced as weight fractions were increased because a single flight of the twin screw cannot hold a large volume of high-density magnetic powder. Attempts to use higher feed rates led to high torque on the motor and stopped the extruder. Other extruder parameters for compounded NdFeB/PC polymer composites are given in FIG. 7. The speed is decreased for magnetic higher weight percentage runs for a consistent process flow. A pressure transducer reports instantaneous melt pressure at the die plate. It was maintained below 6.89 MPa (1000 psi) for all the runs. The default emergency stop is activated at 22.06 MPa (3200 psi). It is important to keep note of the melt pressure throughout the trial run as it can be used as an indication of steady compound throughput.

Figure 8:
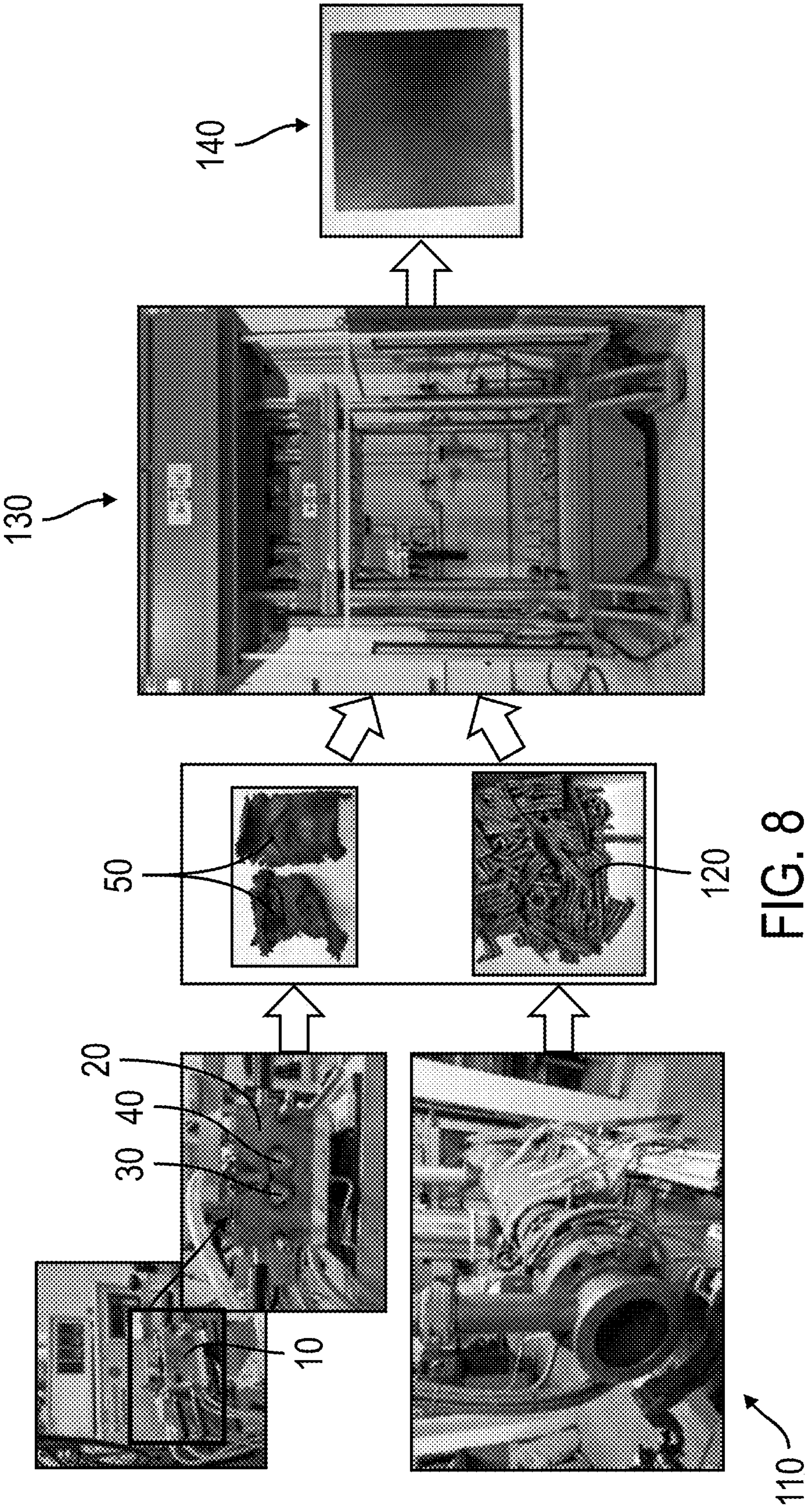
FIG. 8 shows views of the processing equipment and output produced in accordance with certain embodiments.

Polymer magnetic composites produced on the Brabender® batch mixer as well as the on the TSE were compression molded using a 150-ton hydraulic press (as shown in FIG. 8). The press has a temperature control system for upper and lower platens with a maximum temperature of 360° C. A steel tool that produced a flat plate of size 15.24×15.24 cm (6×6 in) was used for molding low weight fraction (20-85%) compounds. Higher weight fractions (95%) were obtained by placing compounds between caul plates because minimal flow of the compounds occurred, making use of a tool redundant. It is possible to go up to 98 wt. % of NdFeB in PC polymers. FIG. 8 illustrates a process flow for composite materials obtained using both batch mixing operations and twin screw extrusion operations as discussed above, with the upper left side of FIG. 8 showing the batch mixing set up including the mixer bowl including walls 10, 20 and the blades 30, 40. Resultant batch mixing product 50 from the batch mixing operations is then delivered to the press 130, where plates such as plate 140 are produced. The lower left side of FIG. 8 shows a side end view 110 of the TSE, which yields resultant TSE product 120 that is delivered to the press 130, where plates 140 are produced.

The platens in the press were preheated to 200° C. and allowed to soak heat for one to two hours. The surface temperature was monitored using an infrared thermometer. As extrudates were produced on the compounding equipment, they were immediately collected and placed in the press. Pressure was applied differently to low weight fraction and high weight fraction compounds as shown in FIGS. 9-10. For high weight fraction compounds, pressure was applied in a single step and not with gradual increments as done with low weight fraction compounds, which was carried out as set forth in FIG. 9. For instance, as set forth in FIG. 10, for the 95 weight percent NdFeB samples, the compaction pressure was 11.49 MPa (1666.67 psi) with a dwell time of 20 minutes. For the 75 and 85 weight percent NdFeB samples, the compaction pressure was 3.83 MPa (555.55 psi) with a dwell time of 20 min. If the pressure is too high, demolding is difficult. If the pressure is too low, excessive porosity is present. In certain embodiments a range of pressures of about 3.3 to 4.1 MPA for 75-85 weight percent NdFeB and 11 to 12 MPa for 95 weight percent NdFeB may be used.

Tensile testing was conducted with specifications set forth in FIG. 11. All coupons were water jet cut into dog bone shapes in accordance with the ASTM D638 standard. MTS 858 tabletop system with servo hydraulic load frame with 25 kN load capacity was used to perform the tensile testing. Extensometer (MST 634.11E-125) with 25.4 mm gage length and a crosshead speed of 2 mm/min was used for testing. Dimensions of samples adhered to Type I specifications for all samples except Brabender 95% samples. Brabender 95% had a limited area for extracting samples and thus was machined to according to the SS3 type dimensions.

The as received magnetic powders from the manufacturer were analyzed using Zeiss Auriga® SEM and focused ion beam (FIB) dual microscope. Fracture surface of tensile samples were also analyzed. All samples were gold sputter coated using an SPI module before analyzing under the microscope. The detector acceleration voltage is set at 5 kV and the sample working distance is maintained at 10 mm.

Thermogravimetric analysis (TGA) was performed on two samples of each compound. Sample weight used was 10 mg for 20, 50, 70% magnetic w.f. compound and 100 mg for 87 and 95% w.f. compound. Instrument used for measurements was TA instruments Q-50 TGA. The ramp rate used was 10° C./min from room temperature to 600° C. Characterization was performed to determine the weight fraction of the sample. Differential scanning calorimetry (DSC) was used to characterize the melting behavior of PC resin. TA instruments DSC Q2000 was used for the analysis. The heat-cool cycle was conducted at a ramp rate of 10° C./min from 40° C. to 200° C. and vice versa. DSC was performed to determine the melting point and processing temperature range.

The magnetic properties of compounded and compressed polymer composite magnet samples are measured using Quantum Design SQUID magnetometer in as compressed molded and after application of 2 T aligning field while heating up to 500 K. The as compounded and field aligned samples' field dependent magnetization at 300 K measured and energy products are determined and compared with starting powder using the company provided specs. Since an important figure of merit is the energy product $(BH)_{max}$, which is proportional of square of loaded magnet volume, it was characterized for the highest magnetic volume loaded samples (87 weight % and 95 weight % samples).

Figure 12:
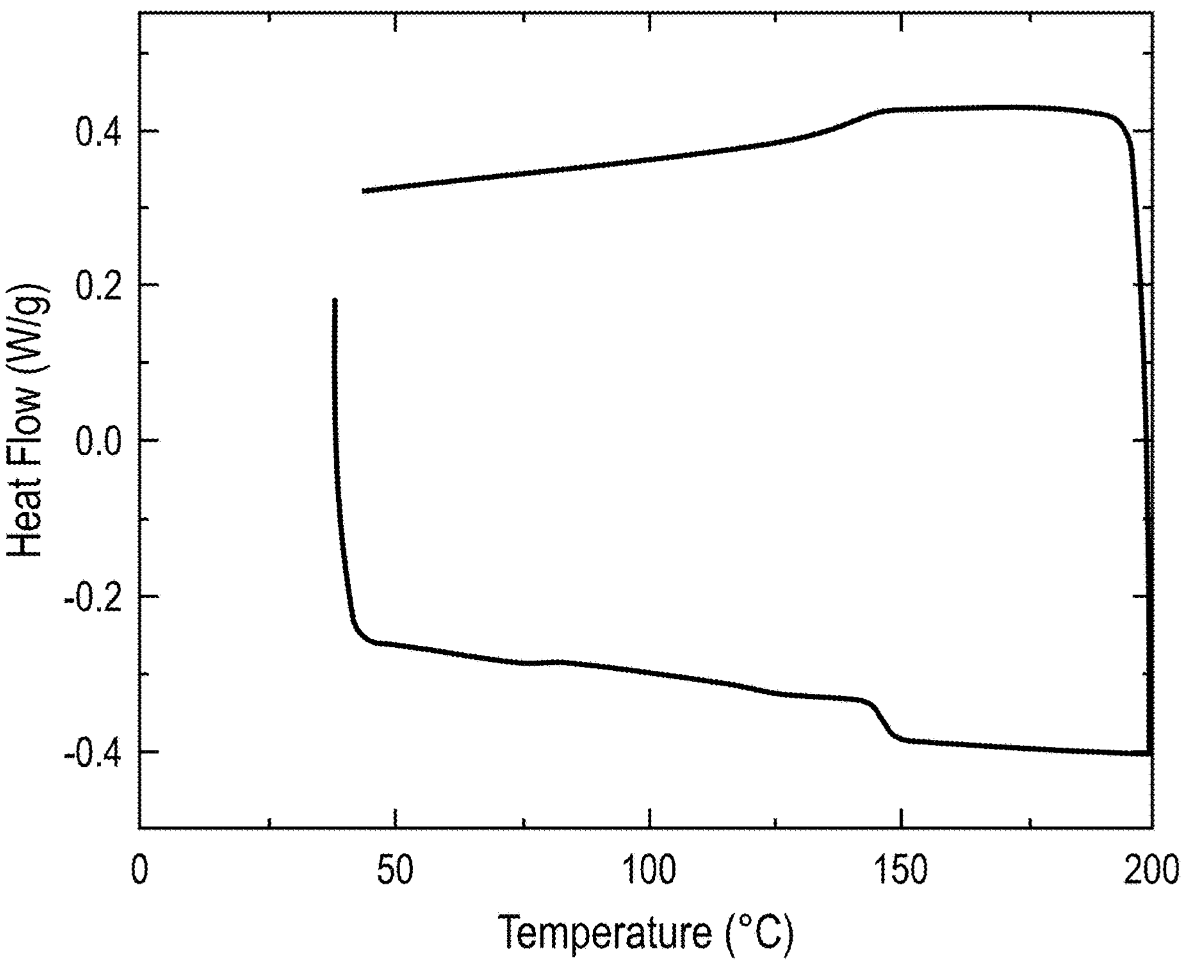
FIG. 12 shows DSC (differential scanning calorimetry) analysis for polycarbonate used in certain embodiments.

FIG. 12 shows the DSC results for neat polycarbonate, analyzed using a heat-cool cycle. It was found from the heat cycle that the melting point of PC was in the range of 145° C.-150° C. and the recrystallization starts at 155° C. Melting point refers to a flow temperature, which is the temperature at which the PC, which is generally an amorphous material, flows as a liquid. Similarly, recrystallization refers to the temperature at which the liquid material begins to solidify. The melting point represents the lower limit needed for processing the resin (P. Yeole, A. A. Hassen, S. Kim, J. Lindahl, V. Kunc, A. Franc, U. Vaidya, Additive Manufacturing 34 (2020) 101255). It was found that barrel temperatures ranging from 180° C.-220° C. were optimal for processing the resin with magnetic compound. It was found that although 180° C. was sufficient barrel temperature to achieve melt flow in both the compounding equipment's for low weight fraction magnetic compounds (20%, 50%), the temperature had to be significantly increased to 200° C. to 220° C. for higher weight fractions for adequate melt flow.

Figure 13:
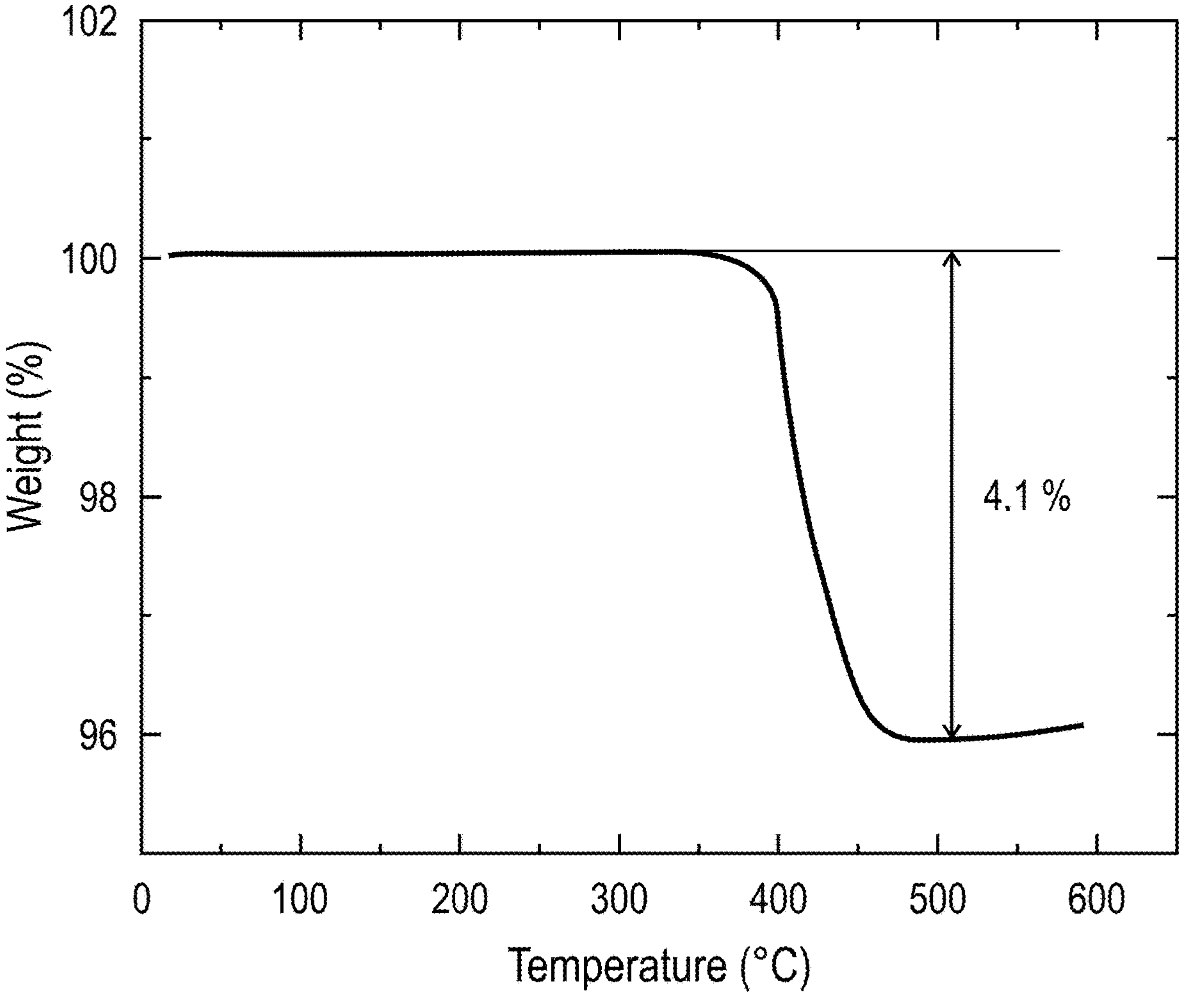
FIG. 13 shows TGA (thermogravimetric analysis) analysis for polycarbonate used in certain embodiments.

FIG. 13 represents the TGA data for 95% NdFeB weight fraction product. It shows the degradation behavior of the PC resin in the compound. The test is performed at a ramp rate of 10° C./min and resin burn off begins in the range of 300° C.-325° C. and ends at 500° C. The weight of compound lost is recorded and corroborated with the processing weight fraction used. FIG. 13 shows a resin loss of 4.109% indicating a magnetic weight fraction of 95.89%. Since the test was performed in an inert nitrogen atmosphere, it can be safely assumed that weight at the termination of the test is purely of the NdFeB intermetallic compound.

Figure 15A:
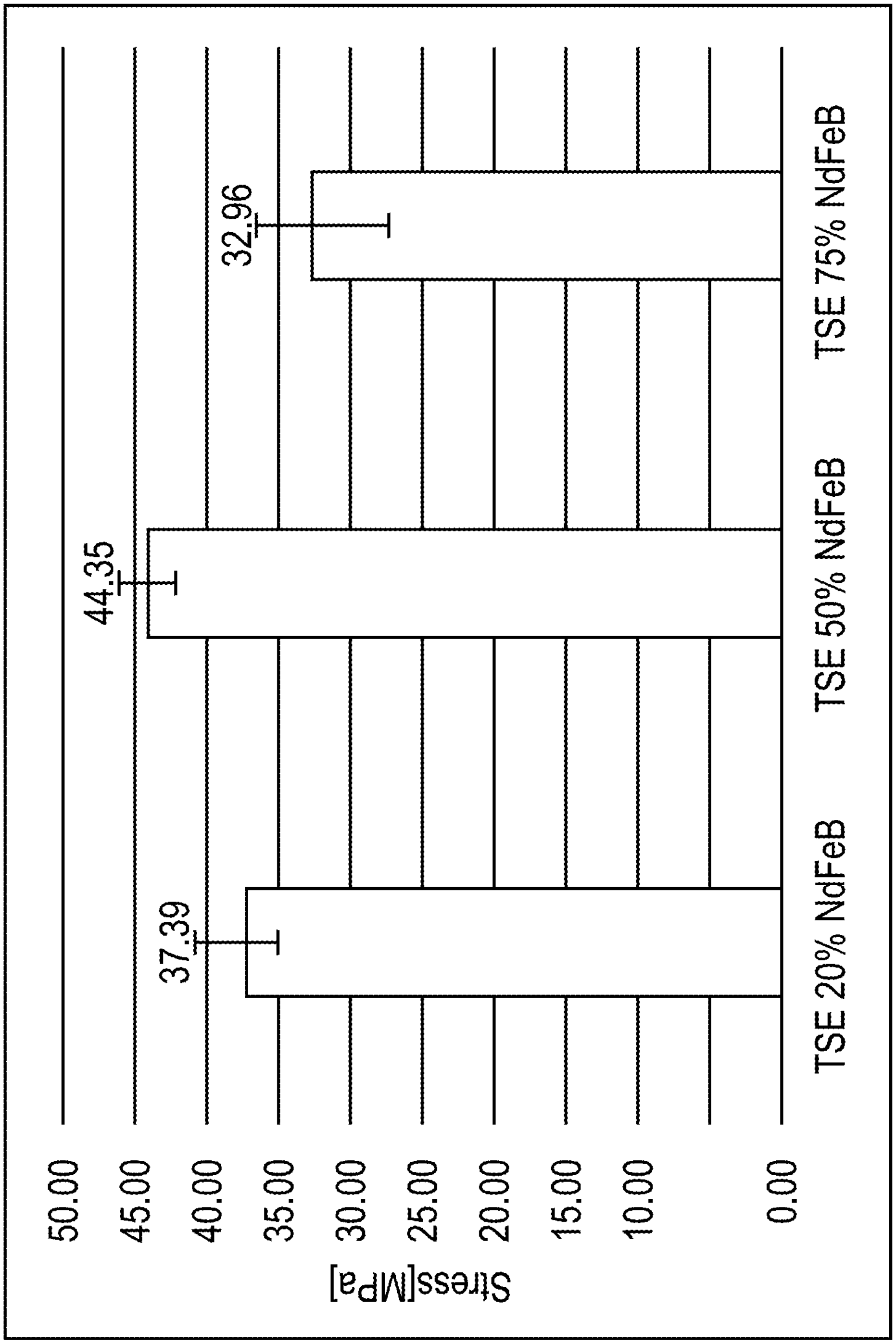
FIG. 15A is a bar graph including tensile strength data for twin screw extruded material formed in accordance with certain embodiments.
Figure 15B:
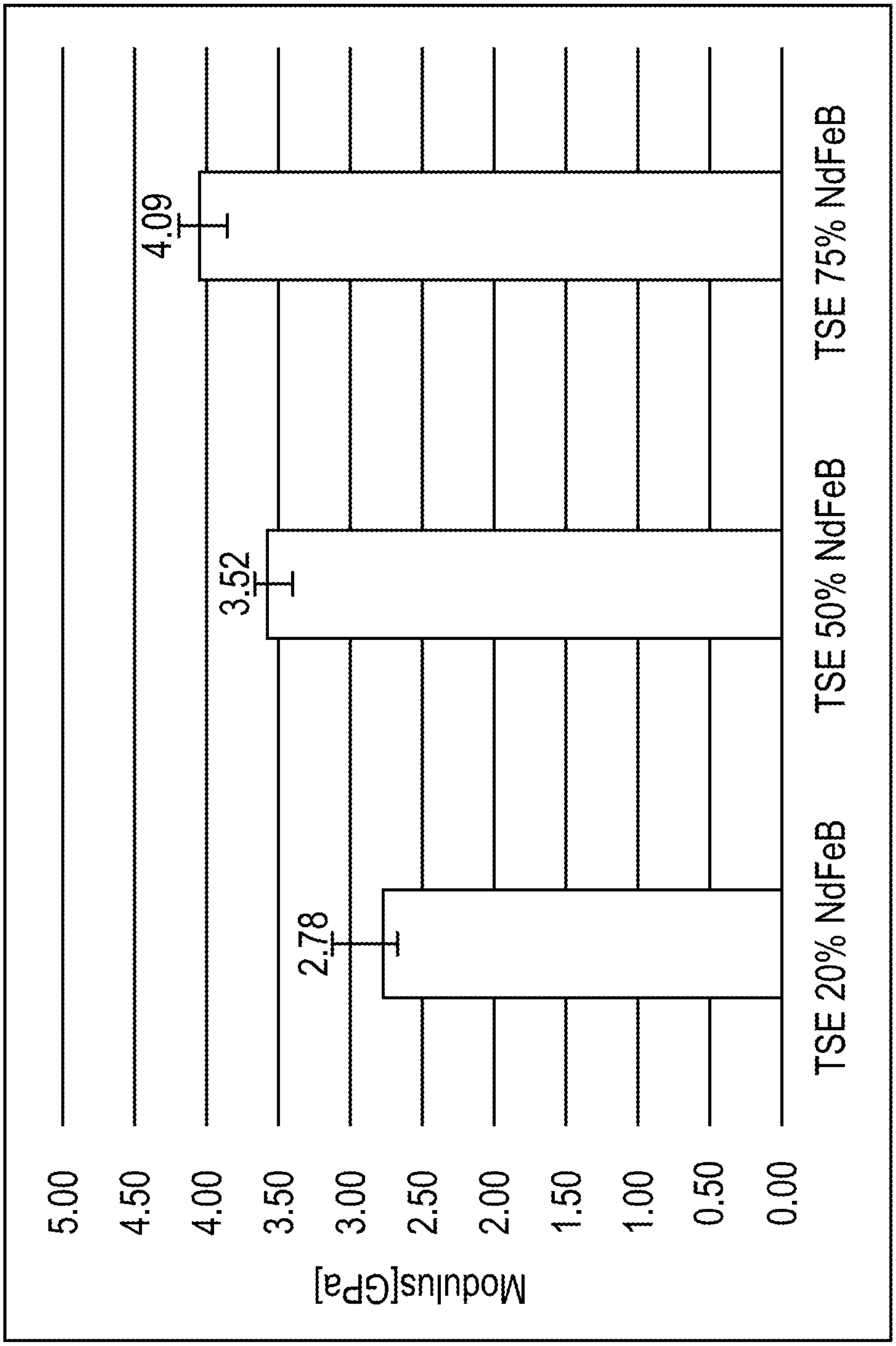
FIG. 15B is a bar graph including tensile modulus data for twin screw extruded material formed in accordance with certain embodiments.
Figure 16A:
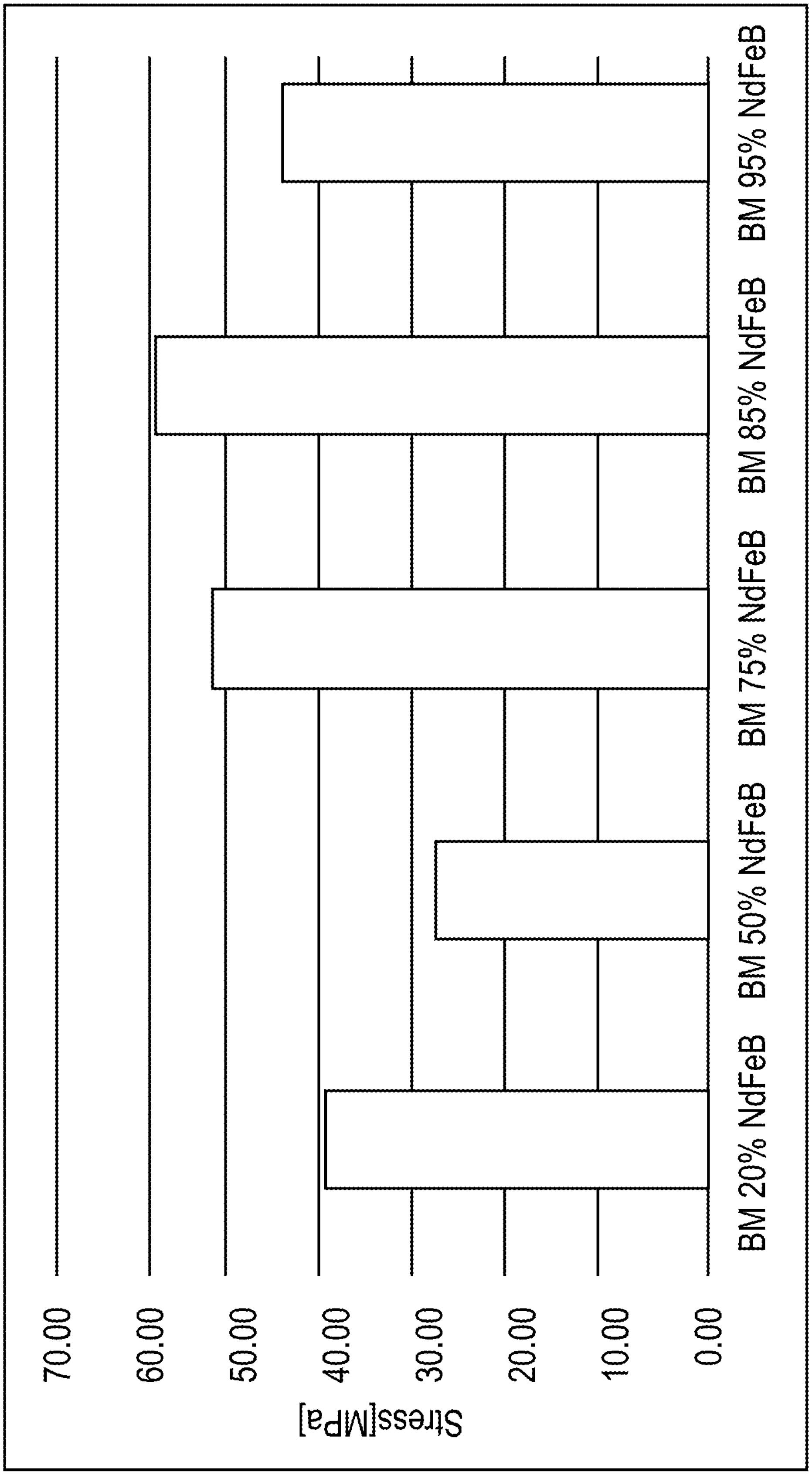
FIG. 16A is a bar graph including tensile strength data for batch mixed material formed in accordance with certain embodiments.
Figure 16B:
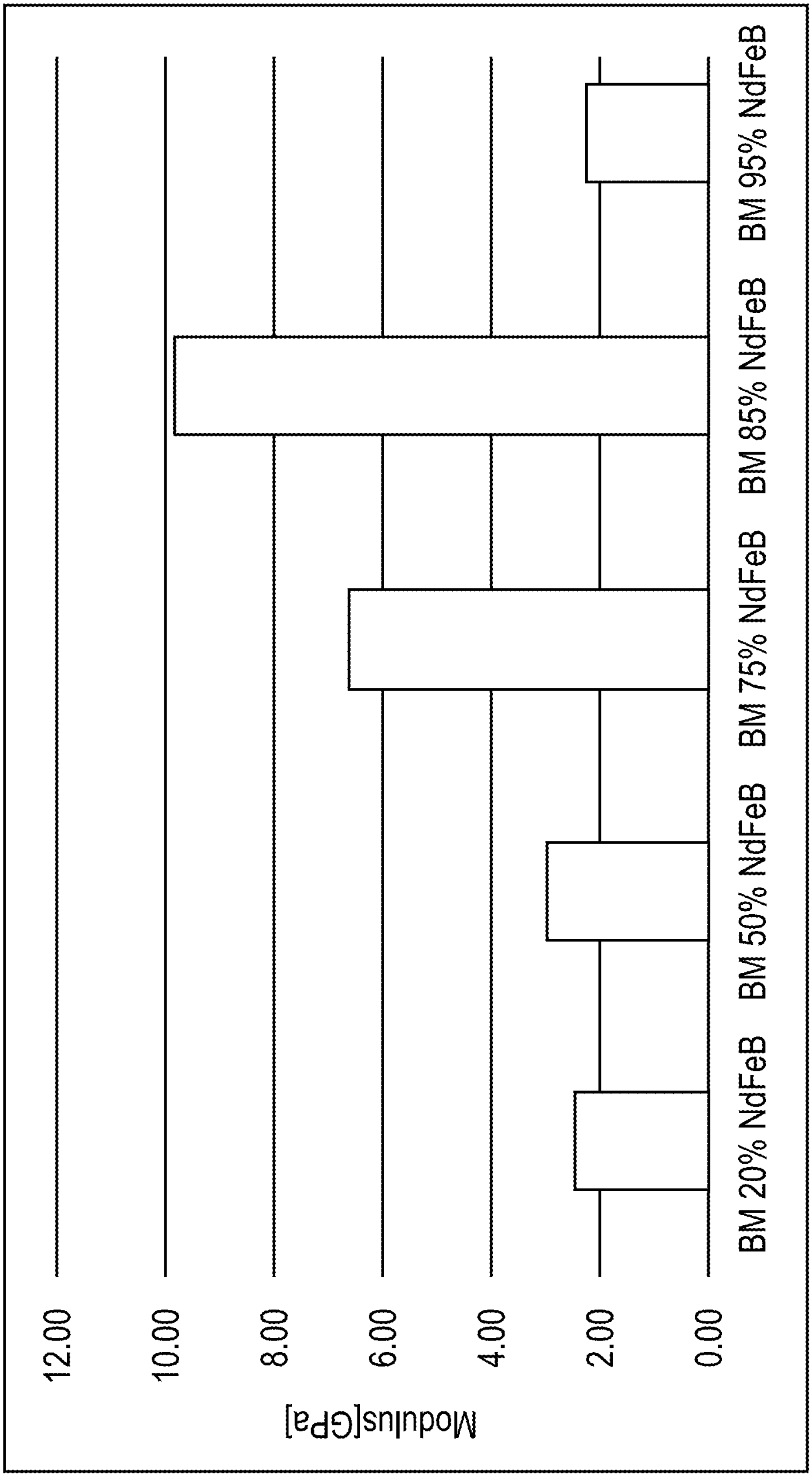
FIG. 16B is a bar graph including tensile modulus data for batch mixed material formed in accordance with certain embodiments.

All compounds of the polymer magnet composite were tested for tensile properties. FIGS. 14, 15A-15B, and 16A-16B include the properties obtained for TSE and batch mixed polymer magnet composite samples. As seen in FIG. 15B, for TSE samples the stiffness increases with higher magnetic loading fraction. As seen in the FIG. 15A, for the TSE samples tensile strength properties, there is an increase between 20% and 50% magnetic loading fraction. The inferior properties of 20% TSE compound point towards lack of homogenous mixing and are likely a result of porosity formation in the material. Batch mixed compounds tensile strength improved consistently with increasing weight fraction until 85% magnetic powder loading as seen in FIG. 16A. Tensile strength for 85% weight fraction compound was close 60 MPa which is only 8% lower than neat PC (polycarbonate) tensile strength reported in the material data sheet. The improved tensile strength can be attributed to an optimized bonding strength obtained between magnetic powders and the PC matrix around 85 wt. % NdFeB loaded magnets. The same phenomenon explains the high tensile strength of 44 MPa obtained for 95% w.f. batch mixed samples. There is an observed difference in tensile properties between TSE and Brabender batch mixed samples having the same weight fraction. The low shear screw used in the TSE does not appear to be optimized for higher weight fraction compounding. The lack of shear forces does not appear to adequately melt the polymer and mix the compounds as efficiently as may be possible. The batch mixed compounding may demonstrate the potential to obtain higher strength with efficient mixing. Thus, further optimization may be carried out to scale up and further improve twin screw compounding.

In addition, it appears that greater residence time in the batch mixer may in certain embodiments promote homogenizing and result in better bonding between the magnetic particles and the polycarbonate matrix, as supported by the tensile properties data and the microscopy analysis described herein. For comparison, in certain embodiments the twin screw extrusion residence time is about 2 minutes, whereas in certain embodiments the batch mixing residence time is about 10 minutes.

Figure 17:
FIG. 17 is an SEM (scanning electron microscope) view of NdFeB powder used in certain embodiments.
Figure 18:
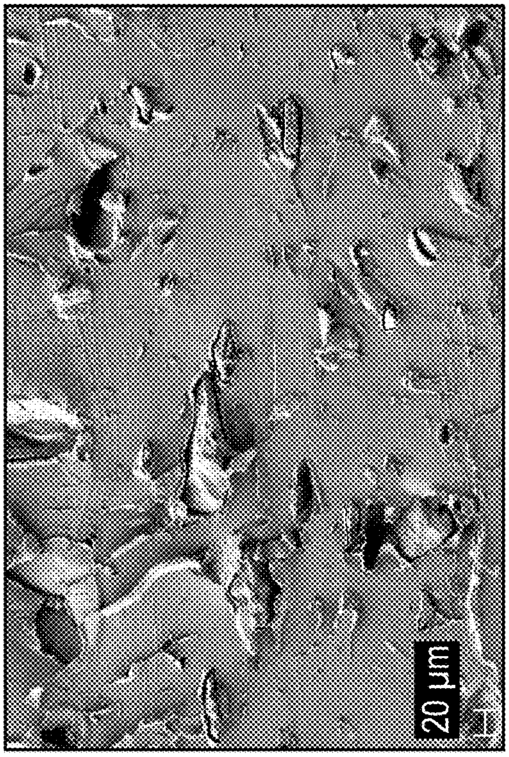
FIG. 18 is an SEM view of a fracture surface of a 20 weight percent NdFeB sample formed in accordance with an embodiment.
Figure 19:
FIG. 19 is an SEM view of a fracture surface of a 50 weight percent NdFeB sample formed in accordance with an embodiment.
Figure 20:
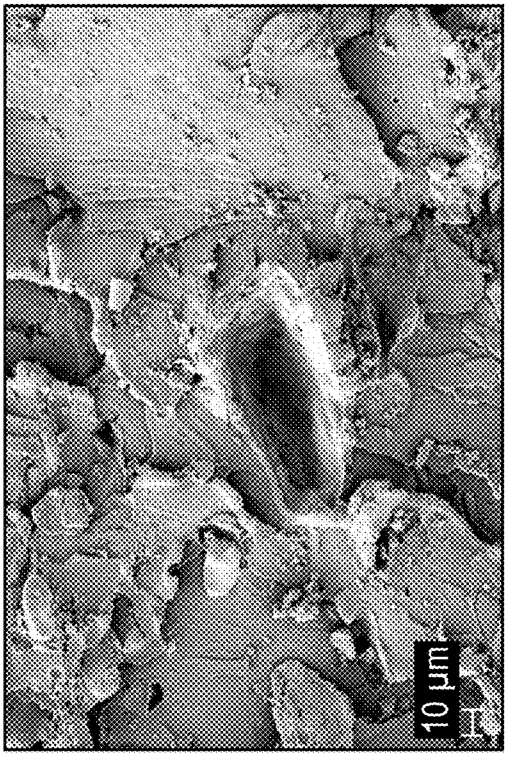
FIG. 20 is an SEM view of a fracture surface of a sample formed in accordance with an embodiment, showing a particle pull-out region.

FIG. 17 shows an SEM view of the microstructure of the as received MQA™ NdFeB feedstock powder. The powder particles have a plate shaped structure and a size typically lying between 100-150 μm. FIGS. 18-19 show the tensile fracture surface of the 20% and 50% magnetic w.f. compound produced on the twin-screw extruder. It can be observed in FIG. 18 that particles are aligned in the direction of melt extrusion and are dispersed sparsely. FIGS. 19-20 shows the particles are more densely packed and are not aligned in the melt flow direction. FIG. 20 also shows a particle pull-out region in the center of the SEM photo.

Figure 21:
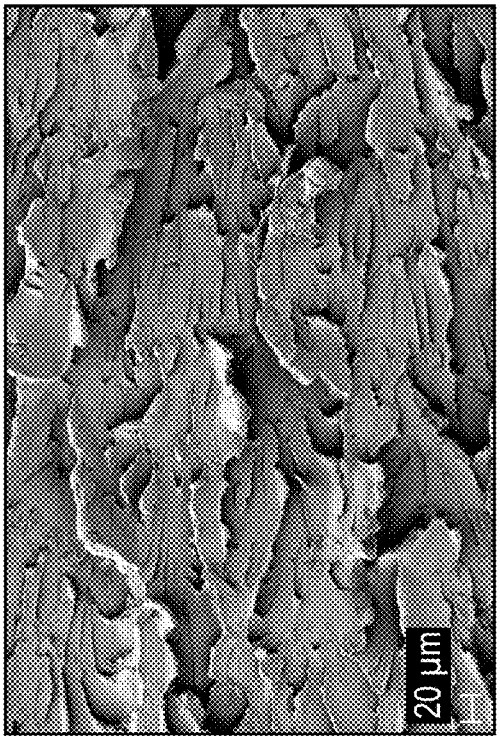
FIG. 21 is an SEM view of a polycarbonate material used in certain embodiments.
Figure 22:
FIG. 22 is an SEM view of a fracture surface of an 85 weight percent NdFeB sample formed in accordance with an embodiment.
Figure 23:
FIG. 23 is an SEM view of a fracture surface of an 85 weight percent NdFeB sample formed in accordance with an embodiment, showing an embedded particle.
Figure 24:
FIG. 24 is an SEM view of a polished surface of an 85 weight percent NdFeB sample formed in accordance with an embodiment.
Figure 25:
FIG. 25 is an SEM view of a polished surface of an 85 weight percent NdFeB sample formed in accordance with an embodiment, at a magnification greater than that of FIG. 24.

FIG. 21 shows an SEM view of the polycarbonate (PC) matrix material. FIGS. 22-25 show SEM views of the microstructure of 85 wt. % NdFeB loaded PC—NdFeB composite. FIGS. 22-23 show fracture surfaces, and FIGS. 24-25 show polished surfaces. An optimal adhesive bond can be observed between magnet particles and polymer matrix. This is evidenced, for example, by the large embedded particle seen in the middle of FIG. 23. The bond strength has been optimized through iterative empirical trials involving combination of magnet particle volume, processing temperature and consolidation from compression molding.

Figure 26:
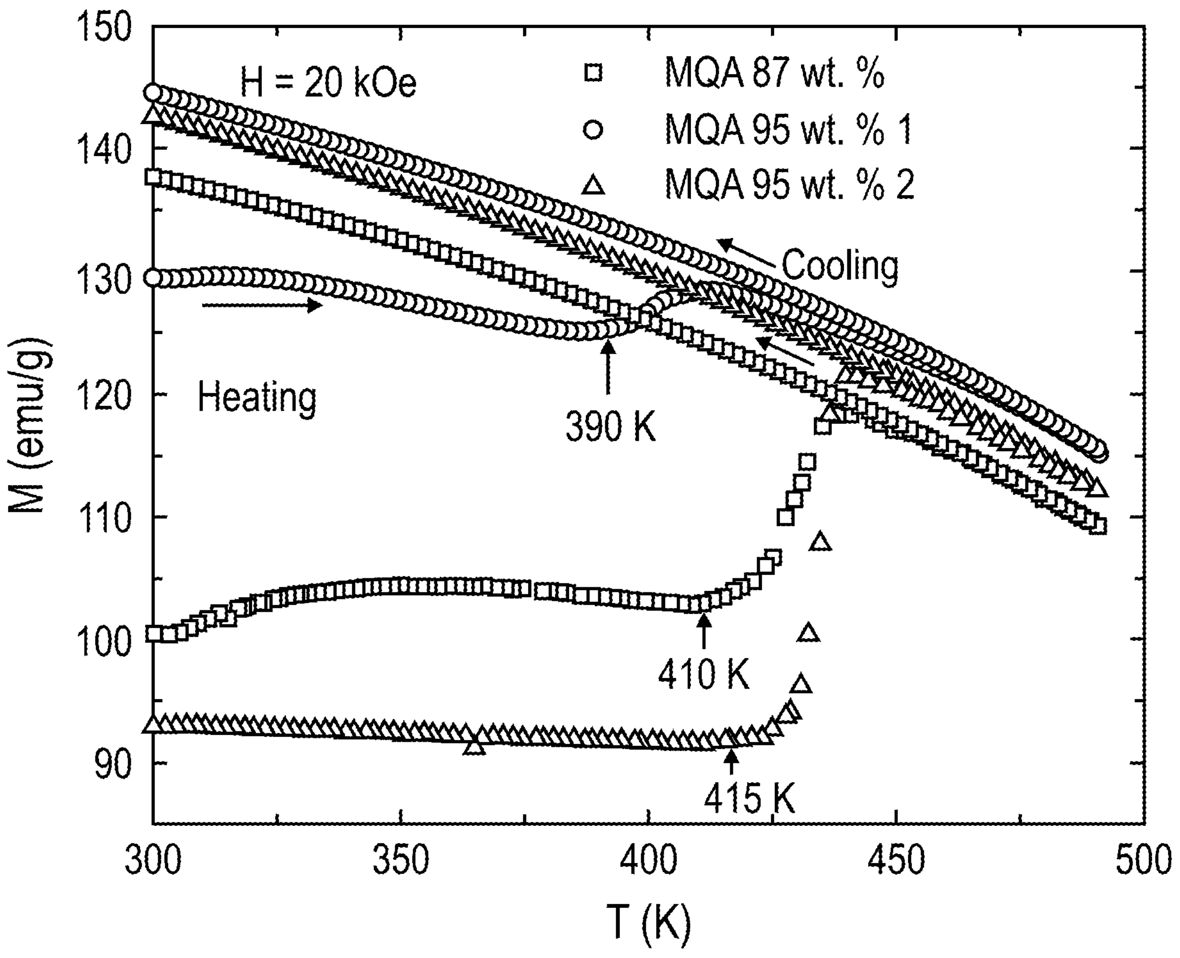
FIG. 26 is a graph including the magnetic heat treatment profile for samples formed in accordance with certain embodiments.

FIG. 26 shows the temperature profile for the magnetic annealing at 2 T applied field. The measurement samples were mounted in a glass tube inside magnetometer and attained about 80 K higher temperature than softening temperature for the composite to allow the alignment of most of the magnetic particles in the direction of the applied field. In an analysis of the magnetization increase in 87 wt. % and 95 wt. % (batches 1 and 2) NdFeB/PC compression molded magnet materials, the M(T) data first decreases with increasing temperature and begins to increase as soon as the polymer began to soften as low as 390 K and becomes maximum when all the magnetic particles are optimally aligned in the magnetizing field direction. The different samples exhibited different temperature ranges of magnetization increasing and decreasing with constant magnetization field of 2 T. It suggests that the relative number of anisotropic magnetic particles aligned in the field direction, their angular distribution determines the warming magnetization M(T) profile. The cooling magnetization profile nature tends to exhibit general M(T) curve for a typical second order phase transition in a ferromagnet. The horizontal right pointing arrows represent the initial warming M(T) profile and the inclined top left pointing arrows represent cooling M(T) profile.

Figure 27:
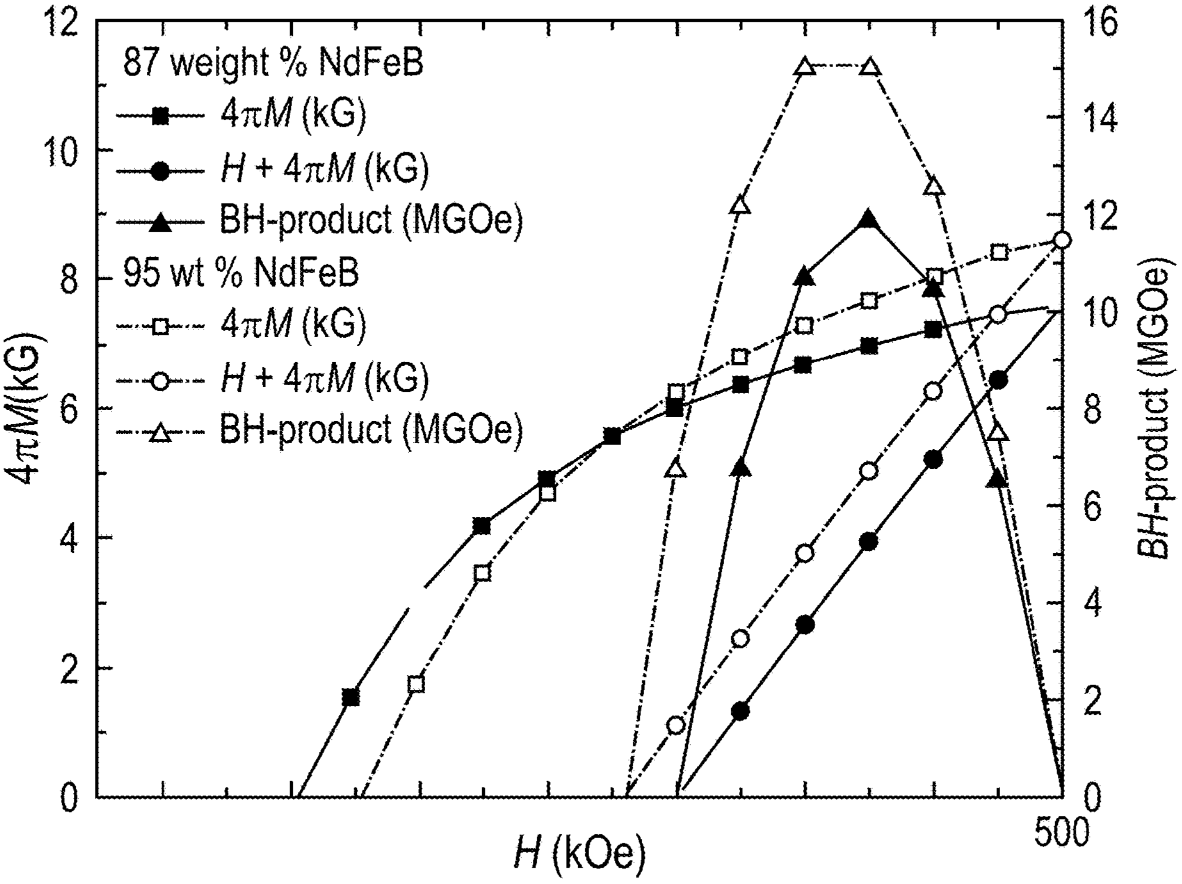
FIG. 27 is a graph including second quadrant magnetization and energy product for samples formed in accordance with certain embodiments.

FIG. 27 shows the demagnetization M(H) curve in the second quadrant and the corresponding BH product curves for the 87 and 95 weight percentage loaded magnetic field aligned samples. The maximum value corresponding to the top of the dome curve provides the $(BH)_{max}$. From the data the 95 weight % samples have a higher magnetic strength. The 87 weight % loaded sample exhibits 94.7 kJ/$m^3$ and the 95 weight % loaded sample exhibits 120.96 KJ/$m^3$ energy product which agrees very well with similar reported literature (J. Ormerod, S. Constantinides, Journal of Applied Physics 81(8) (1997) 4816-4820). The 95 wt. % NdFeB loaded magnet exhibited higher energy product as it is the function of magnetic particles loading (L. Li, B. Post, V. Kunc, A. M. Elliott, M. P. Paranthaman, Scripta Materialia 135 (2017) 100-104).

As described herein, certain embodiments include NdFeB particles and a thermoplastic polymer including a flow temperature of about 155° C. such as polycarbonate as a matrix material for the NdFeB particles.

In summary, polycarbonate and NdFeB bonded polymer magnet composites have been manufactured using melt mixing and compression molding techniques. The mechanical properties, magnetic properties and microstructure have been methodically examined. The bonded magnets demonstrated competitive tensile strength as compared to injection molded nylon- and PPS-bonded permanent magnets (M. G. Garrell, A. J. Shih, B.-M. Ma, E. Lara-Curzio, R. O. Scattergood, M. Materials, Journal of Magnetism and Magnetic Materials 257(1) (2003) 32-43; M. G. Garrell, B.-M. Ma, A. J. Shih, E. Lara-Curzio, R. O. Scattergood, E. A, Journal of Material Science and Engineering: A 359(1-2) (2003) 375-383). The melt mixed and compression molded 95 wt. % PC—NdFeB bonded magnet exhibited ultimate tensile strength of 44 MPa for NdFeB loaded magnets, showing potential for growth in various magnetic applications. Similarly, energy product of 120.96 kJ/$m^3$ was achieved in 95 wt.

% NdFeB—PC compression molded with post high temperature annealing under 2 T alignment field. From the SEM images of the tensile fractures, excellent bonding was obtained between molded PC matrix and magnetic particle particles with increasing loading fraction. This resulted in higher tensile strength of the NdFeB—PC compression molded magnet. As the advanced manufacturing techniques are maturing, the PC based bonded magnets provide promise as high-performance permanent magnets.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while it is possible that aspects of the disclosure may be recited as a means-plus-function language under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed:

1. A method for forming a polymer magnet composite, comprising:

adding polycarbonate to a compartment of a batch mixer and mixing the polycarbonate while the compartment is at a temperature greater than a flow temperature of the polycarbonate, to form a mixed polycarbonate;

adding NdFeB to the compartment with the mixed polycarbonate in four batches while the compartment is at the temperature greater than the flow temperature of the polycarbonate to form a mixed polycarbonate and NdFeB material, wherein each batch is mixed in the compartment for a time period in the range of 1 to 3 minutes before the next batch is added;

wherein a total mixing time is in the range of 6 to 12 minutes; and wherein the compartment includes an inert atmosphere.

2. The method of claim 1, wherein the mixing the polycarbonate is carried out for a time period of 1 to 3 minutes prior to the adding the NdFeB.

3. The method of claim 1, wherein the temperature greater than the flow temperature of the polycarbonate is in the range of 180° C. to 220° C.

4. The method of claim 1, wherein the polymer magnet composite includes a weight percentage of the polycarbonate in a range of 2 percent to 25 percent and a weight percentage of the NdFeB is in a range of 75 to 98 weight percent, and wherein the temperature greater than the flow temperature of the polycarbonate is in the range of 200° C. to 220° C.

5. The method of claim 1, wherein the polymer magnet composite includes a weight percentage of the polycarbonate in a range of 50 percent to 80 percent and a weight percentage of the NdFeB in a range of 20 percent to 50 percent, and wherein the temperature greater than the flow temperature of the polycarbonate is in the range of 180° C. to 220° C.

6. The method of claim 1, wherein the mixed polycarbonate and NdFeB material has a weight fraction of 95 percent NdFeB and 5 percent polycarbonate, and wherein the temperature greater than the flow temperature of the polycarbonate is 200° C.

7. The method of claim 1, wherein the mixed polycarbonate and NdFeB material has a weight fraction of 85 percent NdFeB and 15 percent polycarbonate.

8. The method of claim 1, wherein the total mixing time is in the range of 8 minutes to 10 minutes.

9. The method of claim 1, wherein the flow temperature of the polycarbonate material is 155° C.

10. The method of claim 1, further comprising compression molding a quantity of the polymer magnet composite.

* * * * *